United States Patent [19]
Davolos et al.

[11] 3,809,071
[45] May 7, 1974

[54] METHODS AND MEANS FOR THE DETECTION AND IDENTIFICATION OF LOW LEVEL COMPONENTS OF THE ELECTROCARDIOGRAM COMPLEX WITHOUT LOSS OF REFERENCE TO THE HIGHER LEVEL COMPONENTS

[76] Inventors: Dominick D. Davolos, 176 W. McMillan St., Cincinnati, Ohio 45219; Jerry B. Denker, 9458 Galecrest Dr., Cincinnati, Ohio 45231; Phillip A. Davolos, 106 Lafayette La., Audubon, N.J. 08106

[22] Filed: Feb. 18, 1972

[21] Appl. No.: 227,463

[52] U.S. Cl. .................. 128/2.06 B, 128/2.1 A
[51] Int. Cl. .................................. A61b 5/04
[58] Field of Search...... 128/2.06 A, 2.06 B, 2.06 F, 128/2.06 G, 2.06 R, 2.06 V, 2.1 A, 2.1 B, 2.1 R; 307/237; 328/169; 330/29

[56] References Cited
UNITED STATES PATENTS

| | | | |
|---|---|---|---|
| 3,195,534 | 7/1965 | Bethke | 128/2.06 R |
| 3,195,533 | 7/1965 | Fischer | 128/2.1 B |
| 3,199,508 | 8/1965 | Roth | 128/2.06 R |
| 3,229,687 | 1/1966 | Holter et al. | 128/2.06 A |
| 3,697,780 | 10/1972 | Michael et al. | 307/237 |
| 3,528,405 | 9/1970 | Schuler | 128/2.1 R |
| 3,605,727 | 9/1971 | Zenerich et al. | 128/2.06 A |
| 3,453,546 | 7/1969 | Fryer | 128/2.1 A |
| 3,253,596 | 5/1966 | Keller, Jr. | 128/419 P |

FOREIGN PATENTS OR APPLICATIONS

| 1,247,491 | 9/1971 | Great Britain | 128/2.1 B |

*Primary Examiner*—William E. Kamm
*Attorney, Agent, or Firm*—John W. Melville; Albert E. Strasser; Stanley H. Foster

[57] ABSTRACT

By this invention, and by the use of well known electronic circuitry, low level electric signals may be progressively amplified without loss of reference to other signals, with retention of strict linearity and without damage to recording equipment, by non-invasive methods utilizing electrodes on the exterior human body surface. This is accomplished by the physical method of this invention which incorporates a high gain, low noise, high common mode rejection amplifier with a variable gain control and a preset sharp cut off saturation level. Using this mechanism, low level signals ($p,q,s$) can be gradually increased in gain until they are prominently displayed at the same level as a typical electrocardiogram high level signal ($Q,R,S$) would have been displayed. In the application of this amplifier to the electrocardiography, it is demonstrated that the P-wave may be amplified to a height of 20 mm. on a standard electrocardiograph paper. In this way the relationship of the P-wave to the Q,R,S may be readily determined and diagnosis of abnormal heart rhythms may be greatly facilitated.

18 Claims, 25 Drawing Figures

METHODS AND MEANS FOR THE DETECTION AND IDENTIFICATION OF LOW LEVEL COMPONENTS OF THE ELECTROCARDIOGRAM COMPLEX WITHOUT LOSS OF REFERENCE TO THE HIGHER LEVEL COMPONENTS

BACKGROUND OF THE INVENTION

1. Field of the Invention

The method of this invention permits detailed study of the form of the P-waves in patients with diseases affecting the auricles. The method is equally applicable to other sources of low level activity such as the electroencephalogram (brain wavy) and fetal electrocardiograms. The instrument described will meet all safety standards recommended by the American Heart Association such as complete isolation of the patient from AC powered equipment and at the same time it will incorporate a means of converting data to a more transmissible form for use by tape recorder or telephone and radio transmission.

The importance of the P-wave, its location and relation to the Q,R,S, in the identification of abnormal heart rhythms has long been recognized. The difficulty in the identification of this signal has also long been appreciated by all practitioners of the art. The fact that this signal may be progressively amplified until it attains proportions close to the largest electrocardiogram signal has not been appreciated until the present. Indeed, the American Heart Association in setting forth specifications for recording equipment has specified that there should be no gain control but only fixed levels at one and one-half to two times the standard of one millivolt to one centimeter. The device of this invention demonstrates that this low level signal, the P-wave, may be amplified to very large proportions without increasing undesirable noise and electrical interference simultaneously and that in this amplification a considerable amount of new information about the location, relationship of the P-wave, and its configuration will be obtained.

As indicated, the importance of the identification of the P-wave and the establishment of this relationship to the Q,R,S and the diagnosis of abnormal heart rhythms have long been recognized. Heretofore, however, in order to obtain easily identified P-wave, physicians have resorted to the passage of electrodes inside the heart via the inter-cardiac electrodes or behind the heart via intraesophageal electrodes. The electrocardiogram recorded from such intra-cardiac or intra-esophageal electrodes exhibits very tall sharply pointed P-waves in contrast to the very low voltage blunted P-waves seen when heretofore recorded from the exterior of the body surface. These methods, that is, the intra-esophageal lead and the intracavitary lead, are invasive, often uncomfortable, and not without hazard.

This invention permits the recording of tall, sharply pointed P-waves from the electrodes placed on the surface of the body.

This method is equally applicable to low level components of the Q,R,S complex, such as a small initial $q$-$r$ wave or terminal $s$ wave. Such information may be extremely helpful in the diagnosis of myocardial damage or conduction defects.

These methods should be equally applicable to the study of other low level electrical signals such as the electroencephalogram and electrocardiogram of an unborn baby. These signals are recordable on tape and may thereafter be applied to the long term monitoring of a patient performing his usual activities. After having been monitored on tape, such activites may later be amplified. Thus, when the electrocardiogram so obtained is scanned, it may, if desired, be turned up and any part of the complex amplified.

Another important feature of this instrumentation is the fact that it meets all of the AHA criteria for recording apparatus except for the fact that there is a variable gain control and higher amplification ratio which is essential for this invention.

This invention, due to the amplification possible, may be used to record continuous electroencephalograms. The amplifier set up would provide a simple inexpensive monitor of cerebral electrical activity which could be used, for example, to determine when cerebral death has occurred.

Although this invention is concerned primarily with the P-wave, there is no reason why it could not be directed to similar amplification for study of parts of the Q,R,S, wave and/or the T-wave.

The capacity of this invention to record on tape would make it possible to record for hours electroencephalograms on individuals suspected to have epilepsy. Other ways of recording these brain scans may assist in the identification of mild or atypical epileptic seizures.

It will be apparent, therefore, that the method and means of this invention may be adapted to bedside monitoring, telephone transmission, and radio transmission.

2. Description of the Prior Art

Although a search of the United States patent art has been conducted in order to ascertain the most pertinent of such art, no assertion is made that such art was indeed located. Of the art developed, the following U.S. Pats. appear to be the most significant: Roth, No. 3,199,508; Holter, No. 3,229,687; Thorton, No. 3,267,934; Schuler, No. 3,294,084; Tygart, No. 3,426,150; Keefer, No. 3,508,347; Kelly, No. 3,520,295; Underwood No. 3,532,086; Siedband, No. 3,533,402; and Mansfield, No. 3,565,058. Other U.S. Pats. noted of interest art: Keall, No. 2,194,555; Marchand, No. 2,689,161; Richards, No. 3,030,946; Kaplan, No. 3,342,176; Lawson, No. 3,385,289; Weber, No. 3,453,486; Yen, No. 3,474,778, Jorgenson, No. 3,498,292 and Shaw, No. 3,509,878.

Some of these patents were concerned with transmission of heart data over long distances. This was obtained, however, with expensive bulky equipment. At least one of the patents (Holter U.S. Pat. No. 3,299,687) was concerned with the recording of P-waves and described P-waves with exaggerated characteristics. However, this was a recording of naturally occurring high voltage P-waves. Others (Schuler U.S. Pat. No. 3,294,084 and Siedband U.S. Pat. No. 3,533,402) did describe the amplification of the entire P,Q,R,S,T complex. None of these inventions, however, has attempted to progressively amplify the P-wave or any other low level component of electrocardiogram signal to the point where it was readily identifiable and its relationship to other parts of the complex readily determined. Nor have any of the other inventors pointed out the value of the configuration of these enlarged P-waves in the diagnosis of abnormalities of auricular function. The objects of, and realized by, this invention, therefore, include the obtaining of more meaningful electrophysiological data from the human body with improved, simplified and more economical equipment. Data which can be read directly or stored and which, in either case, can be transmitted over short or long distance without the loss of significance of fidelity, is obtained.

SUMMARY OF THE INVENTION

The system, method and means of this invention enables one to make use of electrical data from the patient, especially that generated by the heart, to an amplifying means including a differential amplifier, an emitter, follower amplifiers including an isolating amplifier and a variable gain control amplifier with a saturation cut-off. These means, individually considered, are known to those skilled in the art. They have not, however, heretofore been arranged in the manner so far generally described and as will be set forth later herein with greater particularity and with reference to the drawings. If one wishes to look at the P-wave, this can be done with progressive amplification of this low level signal with the result that a great deal of meaningful information is obtained in the study of abnormal heart rhythms and auricular function. The electrical information thus received is regularly amplified 1 to 1,000 fold in contrast to the current medical practice which seems geared to a one half to two fold range. The amplified electrical information may then be displayed immediately on an electrocardiograph machine or oscilloscope and/or recorded on tape for storage or transmitted by radio or telephone.

After transmission, or storage, the information may be introduced into a demodulator whereby it may be sent through a readily understood read-out mechanism such as an electrocardiogram chart or oscilloscope.

All of the foregoing is accomplished economically and by quite small sized units — the basic unit, for example, may be placed in the case of a portable Norelco tape recorder.

As the gain is progressively increased, the Q,R,S, complex is clipped off when the positive and negative saturation levels are attained. The T-wave remains rounded, but may also exceed saturation levels and become clipped off.

Thus the invention comprises a method and means which includes amplifying, to an unusually high degree, such as 1 to 1,000 fold, electric data from the human body (primarily the heart-electrocardiogram- or brain-electroencephalogram-), modulating the data initially received, taking the data off by an induction coil or the like and transmitting it via radio or telephone to a designed station, demodulating the data, and sending it through a read-out mechanism such as an EKG chart or an oscilloscope; continuous electroencephalograms may be recorded. The means includes an amplifying circuit which may be mounted in an easily hand-carried receptacle and which may be powered by a low volt transistor radio type battery. The patient may be completely isolated from the power supply to the electrocardiograph machine or oscilloscope. The amplifier permits the very marked and dramatic amplification of P-waves to, for example, deflections measuring 15 to 20 millimeters. By registering sharp mono or diphasic wave like intracavitary or intraesophageal potentials, rather than blunt rounded P-waves, identification of abnormal cardiac rhythms is greatly simplified; the study of auricular activity in general is advanced. The amplifying means, working off leads from the body, includes a differential amplifier and an emitter follower amplifier, a filter for limiting low frequency response in the foregoing circuitry, and a pair of operational amplifiers including an isolating amplifier to act as a buffer means and a variable gain control amplifier with a saturation cut-off. By these means the P-wave may be blown up gradually without interruption and without damaging the recording instruments.

BRIEF DESCRIPTION OF THE DRAWINGS

FIGS. 1A through 1C comprise an actual series of recorded EKG tracings showing the changes in the P,Q,R,S,T complex as it is progressively amplified by this invention.

FIG. 4 is a schematic drawing of an operational amplifier used in this invention.

DESCRIPTION OF THE PREFERRED EMBODIMENTS

INTRODUCTION

As best seen in FIGS. 2, 2A, 2B and 2C the overall concept in which this invention is embodied includes an amplifying means generally indicated at 60. The detail of this means is shown in FIG. 3 and will be explained later. These means 60 are utilized to blow up the heart wave P-Q-R-S-T, particularly the P-wave, to a much greater extent than has heretofore been done with the EKG equipment normally employed.

Figure 2:
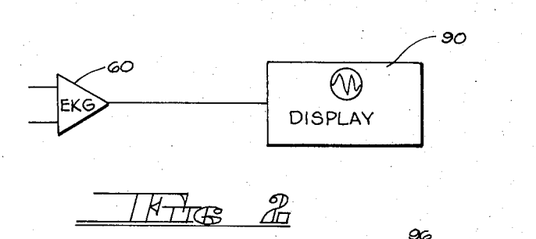
FIGS. 2, 2A, 2B and 2C are schematic diagrams of four embodiments of the invention which may be used.
Figure 2A:
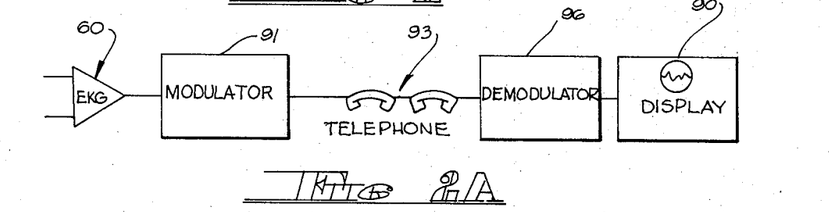
Figure 2B:
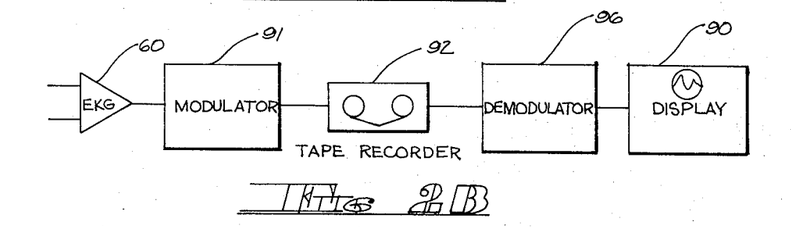
Figure 2C:
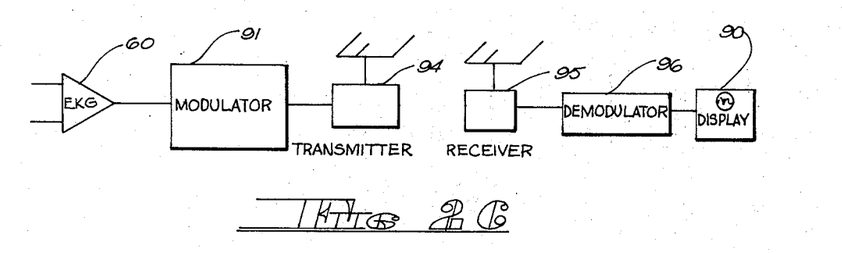
Figure 3:
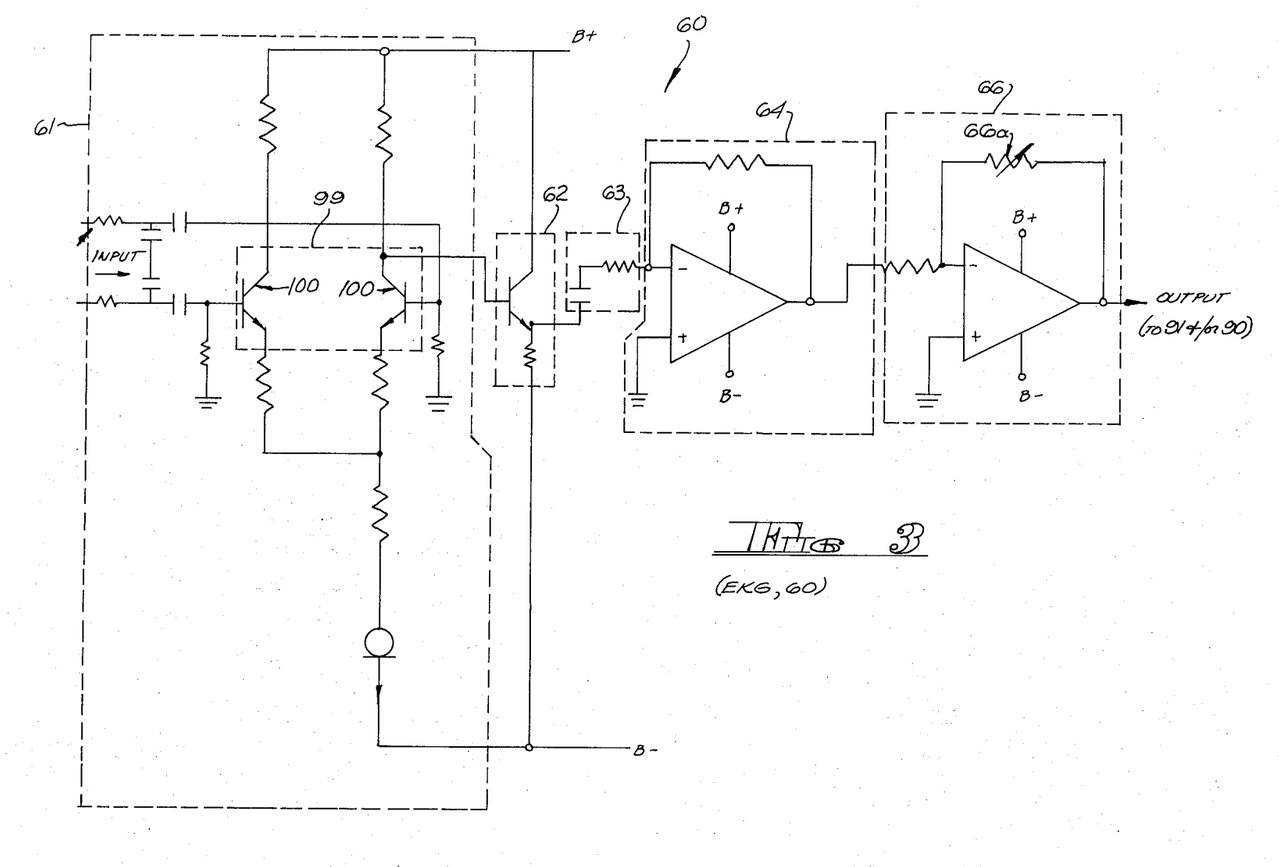
FIG. 3 illustrates the basic circuitry involved in this invention and as incorporated in the very first part of FIG. 2 (the left hand side as represented by the EKG enclosed within a triangle).

The data from the means 60 could be taken directly to the display unit, here represented to be an oscilloscope 90, where it could be read immediately (see FIG. 2). An advantage of this invention, however, is that many other alternatives are available. Thus the data may be fed into a modulator 91 wherein the electrical signals are converted to sound. The sound signals may be taken off by an induction coil or the like and put on tape or transmitted via microphone and radio or sent over telephone equipment. In FIG. 2B it is indicated that the modulator may feed into a tape recorder 92, or a telephone system 93 (FIG. 2A), or a radio system 94, 95 (FIG. 2C). These sounds may be converted back to electrical energy by the demodulator 96 into which they are fed after which they may be directed into a suitable read-out medium such as the oscilloscope 90; such mechanism could just as readily and easily be an EKG chart apparatus.

Referring now to FIGS. 7 through 15 the invention will be described in terms of certain background data and theory underlying same. The general field of electrophysiology will be considered along with some emphasis on the particular field of electrocardiographic genesis of the P-wave. This information is generally available to those skilled in the art in various works and dissertations but is included here as a convenient, albeit rather simplified and elementary, summary of certain of the fundamentals believed to underlie this invention.

Figure 9:
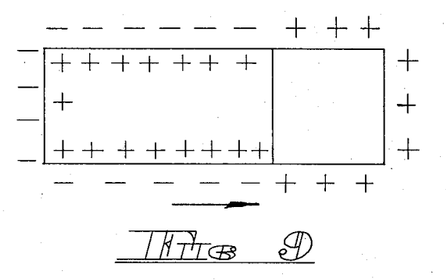
FIG. 9 diagrammatically represents an advance of polarity approximately three-fourths down the muscle cell.
Figure 10:
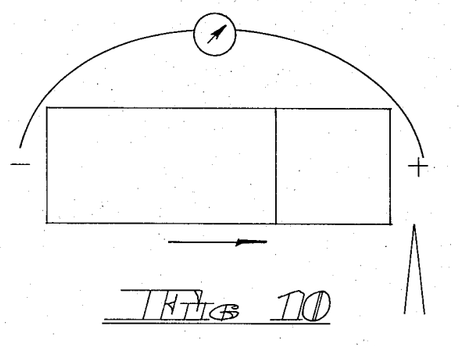
FIGS. 10 and 11 diagrammatically represent the showing of a suitable recording device with terminals at either end of the cell whereby to record the wave of depolarization of dipole.
Figure 11:
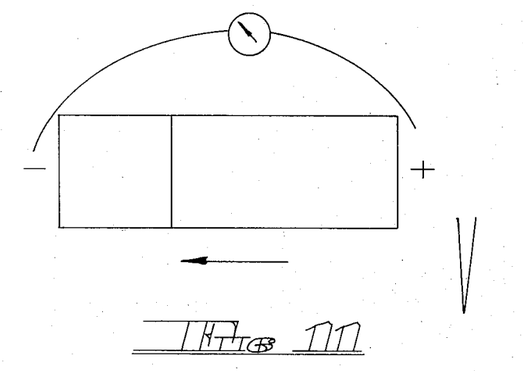
Figure 11A:
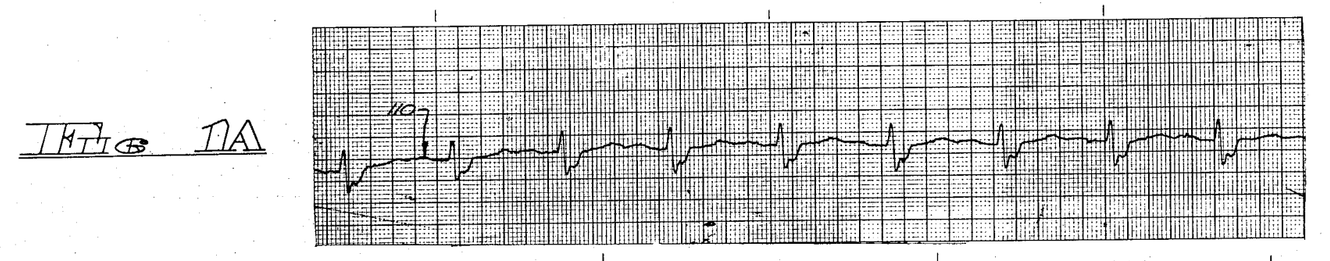
Figure 11B:
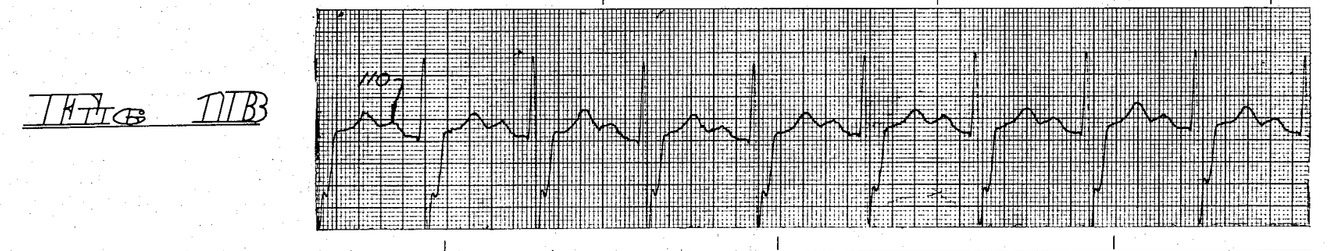
Figure 11C:
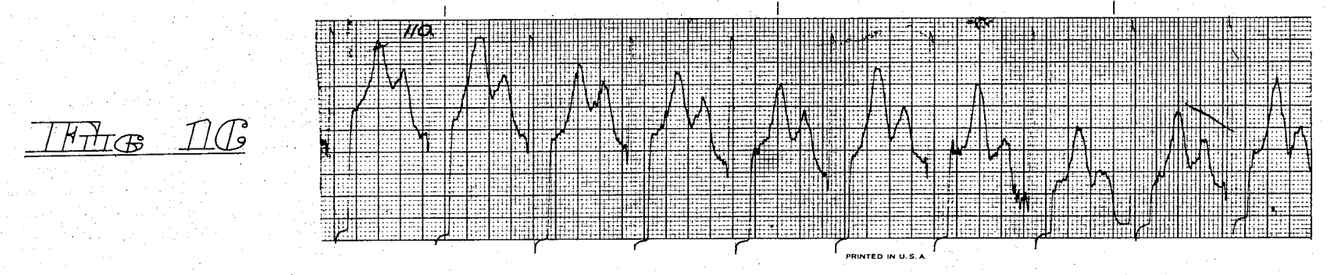

It is generally accepted that the means by which electrical activity is generated and transmitted throughout the heart involves the concept of depolarization. This may technically be a misnomer because rather than is there a loss of polarity, there is a reversal of polarity. This concept considers every heart cell. Each such cell is surrounded by a membrane which is capable of changing its capacity for conducting electricity. In the resting state (see FIG. 7) the membrane does not permit the passing of electrons of electricity. If an electrical stimulus is applied at one end of the cell (see FIG. 8), the membrane becomes permeable to electricity and the charge is completely reversed so that just outside of the membrane is a completely negative charge and just inside of the membrane is a completely and equal positive charge. Change in permeability advances along the cell membrane like the change in cellular polarity. Both advance along the cell membrane as a wave. This wave is actually an interface of changing polarity. Although it is often called a wave of depolarization, it is really a wave of reversed polarization. The electrical field of the juncture of reversed polarity from a dipole. In FIG. 9 the dipole or juncture of reversed polarity has advanced approximately three-fourths down the muscle cell.

If a suitable recording device is placed with terminals at either end of the cell, this wave of depolarization (dipole) may be recorded. If it migrates towards the positive terminal of the recording device, an upper deflection of the needle — a positive reflection — is recorded (see FIG. 10). If on the other hand the dipole or wave of depolarization moves away from the positive terminal (see FIG. 11), a downward deflection is recorded.

Figure 12:
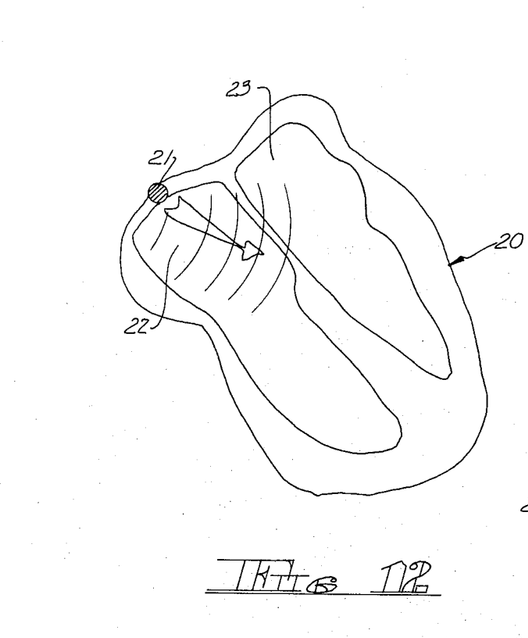
FIGS. 12, 13 and 14 are semi-schematic representations of the heart diagrammatically illustrating certain of the characteristics with which the invention is concerned.
Figures 13, 14:
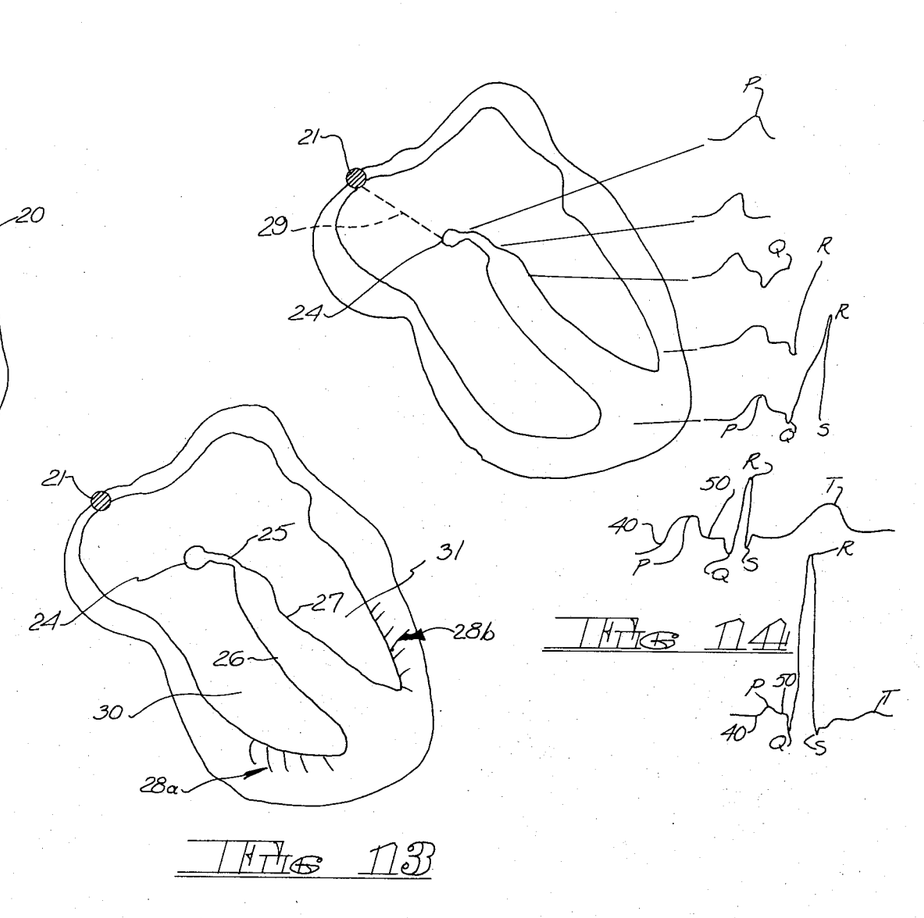

FIGS. 12 and 13 represent the human heart 20. The Sino-Artial Node (or SA Node) indicated at 21 is a highly specialized structure located in the right atrium 22. The SA Node has the capacity for independently generating electrical potential in regular and rhythmical fashion — it is, in effect, a normal pacemaker. The node, however, is governed by chemicals in the blood stream and by nerves in the parasympathetic nervous system. This highly specialized structure is capable of producing just the right heart beat for the needs of the individual. The rate may be as low as 30 beats per minute during sleep to 180-190 beats per minute during violent exercise.

The atria (the left atrium is indicated at 23) 22 and 23 are two thin walled storage chambers. The Atrio-Ventricular Node (or AV Node) indicated at 24 is a highly specialized conducting tissue of the heart which leads to the Bundle of His 25. This Bundle of His 25 then divides into two major branches, the right bundle 26 and the left bundle 27. (Recent evidence indicates that there may actually be three separate entities but for the purpose of this explanation and illustration it will be assumed that the classical concept of two bundles is correct.) These right and left bundles 26 and 27 then divide into a conducting network, called the Purkinje System, indicated at 28a and 28b.

Each wave of electrical activity arising in the SA Node 21 commences radially in an undulating fashion throughout the atria 22 and 23. (The transmission of this wave is much like the ripples produced when a stone is thrown into still water.) When the wave arising in the SA Node 21 moves through the atria (and/or auricles — the atria and auricles will be treated as essentially the same for purposes of this discussion) as indicated by the dotted line 29 (see FIG. 14) to the AV Node 24, the broad wide P-wave is inscribed. As the wave progresses the R is inscribed and, along the way thereto, the Q. When the wave reaches the point in the myocardium underlying the electrode — a recording electrode — the downstroke of the R-wave is inscribed. At this point the heart muscle cell is completely depolarized — or the polarization has been completely reversed. The process of depolarization is followed by the process of re-polarization, in which restoration of the electrical potential which was present before excitation is restored. This, more or less represented by the S portion of the wave, is the resting stage of the positive charge outside of the membrane and the negative charge inside the membrane. Such process of repolarization results in the inscription of the broad T-wave.

It should also be noted that the process of repolarization inside the atria may influence the terminal portion of the P-wave. The P-wave will be discussed in greater detail shortly.

The mass of the ventricles 30 and 31 is relatively large in comparison to the atria. As a result, depolarization of the ventricles results in the inscription of tall complexes which can normally measure as much as 25 millimeters. The atria, on the other hand do not normally inscribe potentials in excess of five millimeters and, very frequently, the activity of the atria is barely visible, sometimes invisible, on the electrocardiograph tracing.

The ability to identify atrial activity and define its relationship to ventricular activity is critical to the recognition and management of abnormal heart rhythm. An abnormal heart rhythm results whenever the pacemaker 21 (the SA node), by virtue of drug, disease, or other influence, is not able to carry out its normal function. If the normal pacemaker is depressed for any reason, the heart beat will arise in another focus. This focus may be anywhere in the atria 22, 23, the ventricles 30, 31 or any part of the conducting system.

The identification of the origin of the ectopic pacemaker is critical to effective management of the abnormal rhythm. If, for example, the abnormal rhythm has its origin above the AV Node 24, Digitalis is very often effective for either slowing the rhythm, controlling the rhythm or completely reverting the rhythm back to normal. On the other hand, if the abnormal rhythm arises below the AV Node 24, the use of Digitalis is not only ineffective to achieve any control but also it may be lethal. Abnormal heart rhythms arising below the AV Node 24 are called Ventricular Arhythmias. Abnormal heart rhythms arising above the AV Node are called Supra Ventricular Arhythmias. Drugs which may be very effective in treating ventricular arhythmias may often be totally ineffective in treating supra ventricular arhythmias.

As earlier indicated herein, others have recognized that identification of the P-wave and its relation to the Q-R-S is important in the management of problems such as discussed briefly above. Very often, however, prior to this invention a practitioner had been required to pass an electrode through a vein into the heart, or through the mouth to the esophagus behind the heart, in order to pick up enough potential from the atria so that they could be recorded effectively. The procedure, for example, of passing a tube into the esophagus or into the heart is obviously not totally innocuous. This sort of problem provided impetus for the instant invention.

This invention is predicated on enormous amplification of the heart wave, particularly the P-wave portion, as in large measure made possible by the circuitry and combination of elements depicted in FIG. 3. By this invention the P-wave may be enlarged up to a length of 40 millimeters (this is 80 percent of the width of the tracing paper commonly employed). In doing this the Q-R-S wave, and the T-wave, are enlarged to the extent that they actually run right off the paper. Even so, this does not result in damage to the recording instruments; the amplifier means makes this possible as will be described in greater detail shortly.

The amplifier means of this invention, as illustrated in FIG. 3, makes it possible to amplify and identify P-waves that before were invisible. Even those P-waves that are superimposed on the up or down stroke of the Q-R-S wave can be located. The only circumstance still defying detection, wherein the P-wave can't be identified, occurs when there are no P-waves, such as in Auricular Fibrillation or Auricular Flutter, or in a nodal arhythmia in which the P-wave is superimposed on the peak or zenith of the Q-R-S. P-waves that are superimposed on either the up stroke or the down stroke of the Q-R-S can be located. By this invention, therefore, it is possible to obtain as much information, and a great deal more safely, as by passing an electrode inside the heart or behind the heart, perhaps more.

As discussed in connection with FIG. 14, the general development of the P-Q-R-S-T wave was explained. The complete, normal wave is illustrated in the bottom portion of FIG. 14. Continued build up of this wave, particularly the P-wave portion, by the amplifying means of FIGS. 2, 2A, 2B, 2C and 3, results in the wave forms depicted in FIG. 15. Thus the P-wave portion 40-50 of FIG. 14 progresses to the form generally indicated at 40-50 in FIG. 15. (keep in mind that FIG. 15 does not necessarily depict the full P-Q-R-S-T wave since parts of it may, in effect, be blown off the paper — the true nature of the P-wave is being sought.)

The P-wave provides information concerning the heart, and heart activity, above the ventricles; the Q-R-S portions provide information as to conditions stemming from the ventricles. This P-wave, particularly as amplified and taught herein, provides one with information both as to the size of the auricles (atria) and as to the fact (or not) of damage. Further, it is believed that the initial part of the P-wave (see FIG. 15) relates to the right auricle and that thereafter the P-wave reflects P-wave conditions due to the left auricle. Such refined analysis is made possible by this invention.

Figure 15:
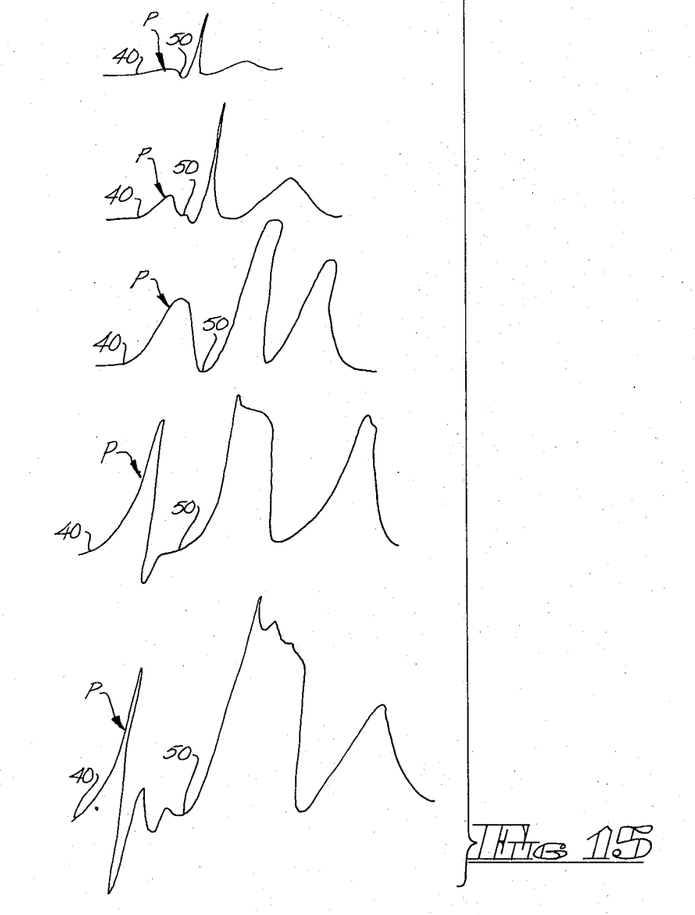
FIG. 15 comprises a series of sketches showing what happens to the P-Q-R-S-T wave, particularly the P-wave, as the body data is amplified by the means of this invention.

With progressive amplification of the P-wave as illustrated in FIG. 15, the wave form changes from a blunt, rounded wave to a sharp, spiked wave. In some individuals with severe myocardial damage, after marked amplification of the P-wave, it develops that the P-wave is not a simple positive deflection; rather it is a complex combination of alternating positive and negative deflections.

Not only does the great degree of amplification achieved by this invention permit the more accurate definition of abnormal heart rhythms, but also it permits a more precise study of the wave form produced by auricular activity in normal individuals and in a variety of diseases causing either enlargement, dilitation or damage to the atria.

Major demonstrative values of that facet of this invention which includes the amplifying means are in the ability to identify otherwise invisible atrial activity and in the ability to permit the more precise study of atrial activity in normal and diseased states.

ILLUSTRATIONS

Figures 4A, 4B, 4C:
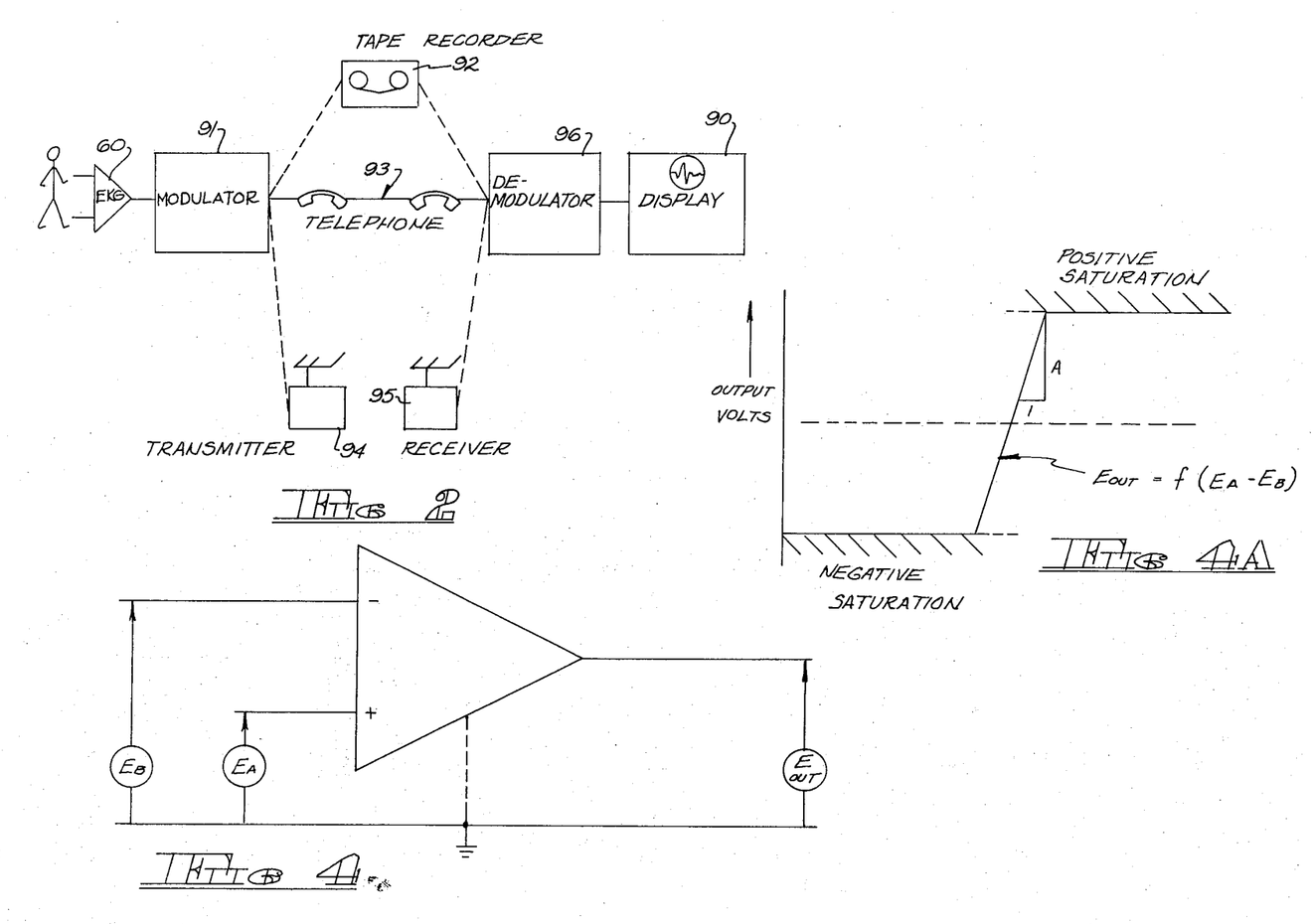
FIG. 4A represents the electrical characteristics of the amplifier of FIG. 4.

The basis for this invention is the use of the basic operational amplifier in utilizing its characteristics to obtain certain end results. Referring next to FIG. 4, the schematic symbol of an operational amplifier is a triangle that indicates the causal direction of single flow. The ground references implied by the — — — lines, the output (E out) of an operational amplifier is related to its input by the equation E out = F (EA−EB) is indicated on the graph of FIG. 4A. For most purposes a useful output signal may be obtained by applying a small signal (EA−EB) between the input terminals; in fact the amplifier output circuit can be saturated by a surprisingly small input. The slope of the nonsaturated portion of the characteristic determines the DC gain (A).

By utilizing the linear region of the characteristic for the normal electrocardiogram complex and also scaling the output saturation regions for the maximum positive and negative display of the oscilloscope or maximum positive negative stylus displacement of the electrocardiograph, approximately 5 mm., there can never be an output signal that will be lost due to the signal exceeding the dynamic range of the display device.

By having an adjustable gain or an adjustable feedback device around the operational amplifier the gain of the amplifier can be slowly increased while monitoring the oscilloscope or electrocardiograph. As a gain of the operational amplifier is increased, signals that were normally in a linear region of the amplifier will now either be clipped at the positive or negative saturation lines. All potential will be accurately recorded and inscribed.

This description of circuitry is not limited to using operational amplifiers as the active devices since this same type of electrical action may be achieved by many other discrete components such as electron tubes, transistors, etc. using variable gain controlled amplifiers and limiters or peak chopper circuit configurations.

The operational amplifier or equivalent circuit can be modified to become a logarithmic amplifier. This type of configuration would thereby display all of the EKG complex including the high amplification of low level signals, that is, P-wave etc., without the requirement of the saturated characteristic (clipping action) described above. The only modification to a normal EKG display would be the use of a logarthim scale instead of the typical linear scale that is presently used.

FURTHER REFERENCE TO FIGS. 2, 2A, 2B, 2C AND 3

As has been earlier indicated, FIGS. 2, 2A, 2B and 2C are schematic diagrams showing how the invention may be used. In one case the amplifier is directly connected to the patient and its output is sent directly to a display device such as an oscilloscope or an electrocardiogram graph recorder. The other means of storage and transmission can be shown where the output of the invention is fed through a modulator whereby the information is converted to an audiotone, whereby then it may either be recorded on a tape recorder or transmitted over telephone or transmitted over a radio transmitter. The demodulator is used to restore this audo information back to a normal electrocardiogram system.

FIG. 3 illustrates the basic circuitry involved in this invention and is incorporated in the very first part of FIGS. 2, 2A, 2B and 2C (the left hand side as represented by the electrocardiogram enclosed within a triangle).

With further reference to FIG. 3, the amplifying means 60 (see also FIGS. 2, 2A, 2B and 2C) is shown in considerable detail. These means permit amplification of body data in the range of 1 to 1,000 fold, and even beyond, without damage to the recording equipment — as distinguished, for example, from current medical practice of amplifying only on the order of two fold. It will be understood that everything shown in FIG. 3 is embraced within the amplifying unit generally indicated at 60 in FIGS. 2, 2A, 2B and 2C.

Data from the body is introduced into a differential amplifier (low noise amplifier) 61 very generally indicated by the matter roughly embraced by the dashed line so marked; this produces basic amplification in a workable range. (As will be described, various of the other matter shown in this Figure will be generally designated by additional of these dashed lines).

The differential or low noise amplifier 61 includes, as indicated within the dashed lines 99, a pair of low noise transistors 100 as a part thereof.

The data initially amplified at 61 is then fed into an emitter follower amplifier 62. This further refines the data as will be apparent from an examination of this FIG. 3 and as will be understood by those skilled in the art. It should again be emphasised that this is generally true of everything shown in this Figure, individually considered. The selection of such individual components, however, and the sequence of their arrangement, is believed novel.

From the emitter following amplifier 62 the further modified data is passed through a filter 63 the function of which is to limit any low frequency response in the initial part of this circuitry.

Data from the filter 63 is sent to a first operational amplifier 64 which functions as an isolating amplifier. This protects the system from feedback caused by anything yet to be described. Following the isolating amplifier is a second operational amplifier 66 arranged to effect gain control as indicated at 66a. This amplifier 66 is illustrated as a variable gain amplifier with saturation cut off.

The output from the last part (the variable gain control amplifier 66) of the amplifying means 60 (see also FIGS. 2, 2A, 2B and 2C) may then be fed into the modulator 91, or directly into suitable read-out mechanism 90, all as earlier described.

As will be readily understood by those skilled in the art from an examination of the accompanying drawings and with reference to the description thereof herein set forth, the means 60 permits the P-wave to be amplified gradually and without interruption — a build up in "gain" — without, for example breaking the stylus as other parts of the Q,R,S wave simply run off the chart paper. More specifically, the variable gain amplifier 66 is "saturated" in that it is provided with an electric cut off, so that, when the needle hits the edge of the paper, continued increase in amplification of everything else within the range of the needle and paper strip may continue. Incorporating this feature in a system geared to the human body is also a part of this invention.

FURTHER REFERENCE TO FIGS. 1A-C, 5A-C AND 6A-C AND FIG. 14

As is emphasized herein, the primary purpose of this invention at present is the application of the circuitry described above to the recording of electrocardiograms. As has also been noted earlier, the accepted theories of the mechanism whereby heart muscle generates the characteristic wave of electrical activity are handled quite well in a number of texts. By way of further review, however, the dipole theory holds that the heart cell in its resting state contains a positive charge on the outside and a negative charge on the inside and the charges are separated by a semi-permeable membrane. In this membrane, change in permeability permits the neutralization of charges. The depolarization process passes down the cell like a wave. This wave of depolarization generates the electrical potential that is recorded as the characteristic electrocardiographic complex. The conduction of this wave through the auricle results in inscription of the P-wave. As this wave passes through the AV node, the PR segment is inscribed. As the impulse is conducted from the AV node to the Perkinje (conducting) system of the ventricles and throughout the ventricular musculature the characteristic Q,R,S is inscribed. The wave of depolarization passes through and activates the entire heart. It is followed by a wave of repolarization, that is, the T wave.

It is presently believed that the most significant application of the instant invention lies in the amplification of the P wave with progressively increasing gain so that it has been possible to inscribe P-waves as tall as 40 mm., although P-waves 10–20 mm. are plenty large for ready identification. At this amplification the P-wave form also changes from the blunt rounded wave usually inscribed from the chest wall to the sharp spiked wave that is usually seem in the esophageal or the intercardiac electrocardiogram (FIGS. 1A through 1C). FIG. 1A shows that the P-wave 110 is barely visible. Through successive stages of amplification (FIG. 1B) the P-wave becomes larger until it becomes sharp and spiked. Finally (FIG. 1C) the Q,R,S complex is limited at a preset level so that the pin will not be driven off the limits of the paper. The P-wave is very sharp and readily identified; its relation to the Q,R,S is easily seem and its configuration is available for study.

In the application of the instrument to patients it has been possible to amplify P-waves to the point where they are readily identifiable even in cases where the P-waves were much too small for any identification in the conventional electrocardiogram. In some instances, this amplifier has rendered readily identifible P-waves that were totally invisible. In other instances it has clearly established that a wave form erroneously identified as P-wave was in reality part of the Q,R,S complex and the "invisible P-wave" was readily seen in front of the Q,R,S (FIG. 5).

In the use of this invention, specifically the apparatus of FIGS. 2, 2A, 2B, 2C and 3, on patients with abnormal heart rhythms, it is possible to identify P-waves that lie very close to the Q,R,S and, in some instances, P-waves superimposed on the up stroke of the Q,R,S or the down stroke of the Q,R,S, may readily be identified. (In two situations it has been impossile to identify a distinct P-wave. One situation was a type II nodal rhythm in which the peak of the P-wave was superimposed on the peak of the Q,R,S. The other situation was with auricular fibrillation in which case irregular f waves were recorded). Generally, however, not only has it been possible to identify the location of the P-wave and its relationship to the Q,R,S, but also it has been possible to precisely record the configuration of the P-wave. As shown in the reproductions of actual, recorded EKG tracings, those which make up FIGS. 1A–C, 5 and 6A–C hereof, the P-wave has exhibited multiple positive and negative spikes when amplified, especially in patients with auricular heart damage.

Figures 5A, 5B:
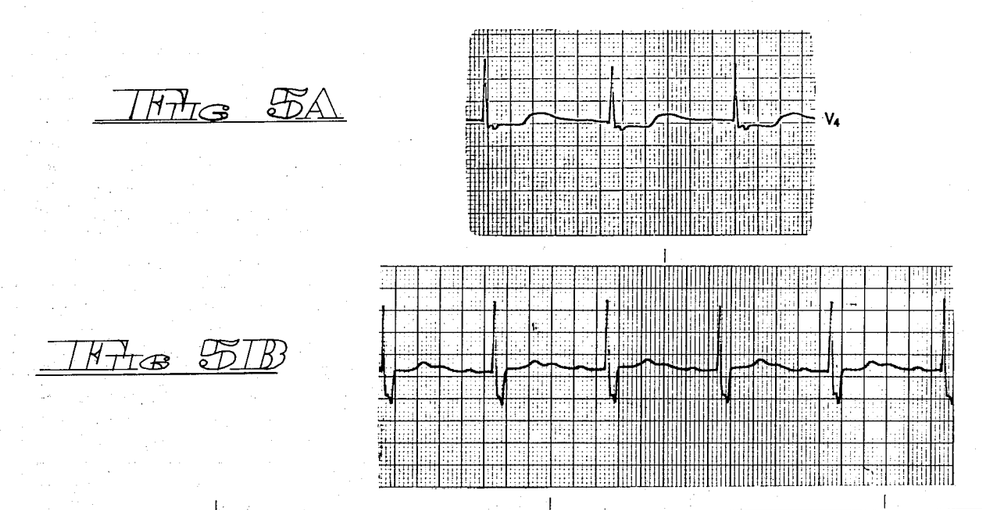
FIGS. 5A through 5C comprise a series of recorded EKG tracings, FIG. 5A representing Lead V-4 of the conventional electrocardiogram, FIG. 5B being an amplified bipolar tracing analogous to V-4 of FIG. 5A, and FIG. 5C showing further amplification of the bipolar tracing of FIG. 5B.

FIG. 5A shows a recording of lead V 4. In this tracing, the QRS complex appears to be followed by an inverted p wave indicating a low nodal rhythm.

FIG. 5B shows a distinct p wave preceding the QRS. The wave which appeared to be an inverted p wave is now clearly seen as part of the QRS complex.

Figure 5C:
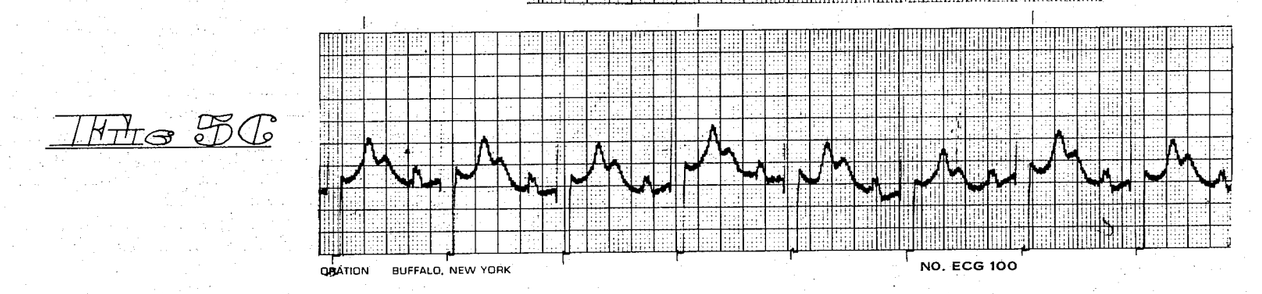

FIG. 5C, after further amplification, reinforces the demostration that a p wave with prolonged p-r intervals precedes an abnormally wide QRS indicating the correct diagnosis of regular sinus rhythm with first degree A V block and bundle branch block.

Amplified P-waves should be very helpful in identifying abnormalities of auricular function in the presence of normal heart rhythms. In particular it should provide information with regard to hypertrophy of the right or left auricle as well as dilation of the right or left auricle. This type of amplifier will also obviously amplify the low level components of the Q,R,S so that a small q or terminal s wave is readily identifiable.

Figure 6A:
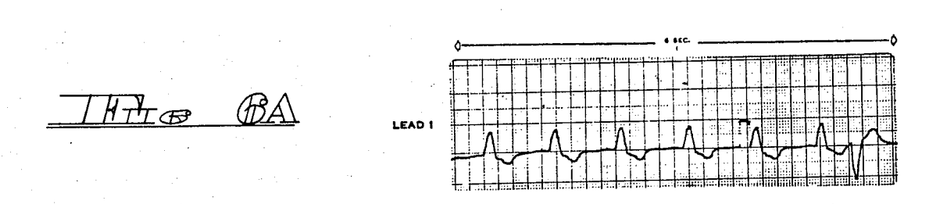
FIGS. 6A through 6C are similar to FIGS. 5A through 5C, FIG. 6A being the recording of Lead I of the conventional electrocardiogram, FIG. 6B being a bipolar precordial tracing amplified by the invention, and FIG. 6C being the same lead shown in FIG. 6B but with greater amplification (gain).
Figure 6B:
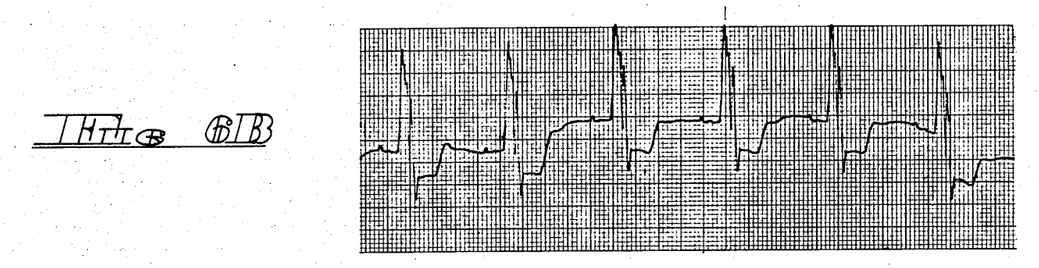
Figure 6C:
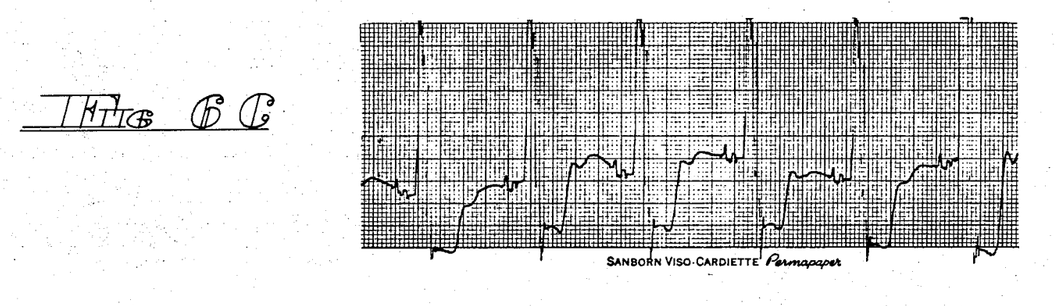
Figure 7:
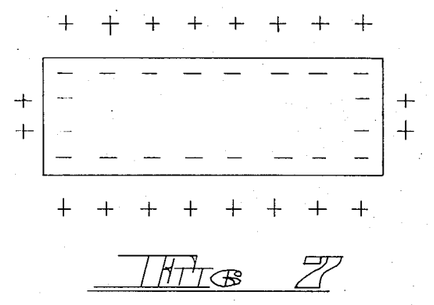
FIG. 7 is a diagrammatic representation of the condition of the membrane surrounding every heart muscle cell when the heart is at rest.
Figure 8:
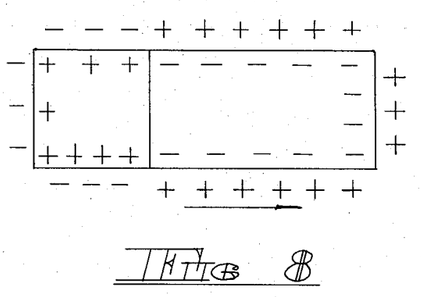
FIG. 8 diagrammatically represents what happens when an electrical stimulus is applied at one end of the cell.

FIGS. 6A through 6C illustrate a further application of this invention. In the uppermost tracing (FIG. 6A), the P-wave is barely if at all visible. The increase in gain (FIG. 6B) is seen so that the P-wave is now visible as a small wave followed by a wide Q,R,S. With further magnification (FIG. 6C), the P-wave is seen to be composed of two sharp and distinct, positive deflections. As the wave of depolarization passes first through the right auricle the first portion of the P-wave is inscribed. As it passes through the left auricle the second portion of the P-wave is inscribed. In all tracings obtained by the application of the teachings of this invention the P-wave is displayed over the entire width of the entire draft paper. At this point the operational amplifier will not permit the needle to record beyond the scope of the paper or the scope of the oscilloscope screen. Thus, readings in excess of those that are recordable within these limits are simply not recorded. Within the limits of the recording paper of the oscilloscope screen, however, complete linearity is retained and reference of each potential to other potentials is maintained.

FURTHER OBSERVATIONS

This invention has application in several areas as set forth above. Although facets of the invention have been described primarily in connection with the human heart, and although certain other features have been described in terms of particular structures and arrangements, none of this is intended to limit the invention unless specifically set forth in the subjoined claims. It will be apparent to those skilled in the art, for example, that although the invention has not yet been used to actually record electroencephalagrams or fetal electrocardiograms, there is no reason why such would not be applicable to these low level signals as well. Hence, the applicability of tis invention is further enhanced by the fact that it can be recorded on tape or changed to an audio form for transmission by radio or telephone. When the electrocardiogram is initially recorded on tape, the tape recorded potential may then be amplified just as the potential taken off the body directly. Change to an audio signal also makes it possible to use the invention in a monitoring set up with complete isolation of the patient from the standard AC electrical power supply.

Although it has been indicated that much of the circuitry utilized in this invention is well known to those skilled in the art of electronics, and although it has been indicated that the importance of the P-wave in the diagnosis of abnormal heart rhythms and auricular abnormality has also been appreciated by those skilled in the art of electrocardiography, nevertheless the application of this circuitry with a progressive gain control to produce progressively amplified P-waves is believed unique.

It will be apparent, therefore, that one skilled in the art, having these teachings before him, may be able to effect modifications in this invention, without, however, departing from the scope and spirit of said invention.

The embodiments of the invention in which an exclusive property or privilege is claimed are defined as follows:

1. Non-invasive means for amplifying electrical body data on the order of 1 to 1,000 fold which comprises, in series, input leads from the body exterior; a differential, low noise amplifier including a pair of electrically connected low noise transistors; an emitter follower amplifier; a first filter for limiting low frequency response; a first operational amplifier which functions as an isolating amplifier to act as a buffer means; a second operational amplifier having variable gain means with saturation cut-off providing 1 to 1,000 fold amplification depending on the amplitude of the signal from said first operational amplifier; output leads connected to said second amplifier; read-out means connected to said leads; and suitable leads connecting all of the items between the said input leads and said output leads.

2. The means of claim 1 in which the said input leads are arranged to carry electrical data from the heart and the remainder of the means are arranged to effect specific amplification of the P-wave.

3. The means of claim 2 arranged in a system including, between the said output leads and the said read-out mechanism, a modulator, transmission means, and a demodulator.

4. The means of claim 3 in which said transmission means comprises a telephone system.

5. The means of claim 3 in which said transmission means comprises a radio transmitter and receiver.

6. The means of claim 3 in which said transmission means comprises a tape recorder.

7. A non-invasive method of obtaining greatly amplified P-waves which includes the steps of applying input leads to the body exterior so as to pick up electrical data from the heart in the usual manner; introducing such electrical data into a differential, low noise amplifier including a pair of low noise transistors; refining such electrical data by then passing it into an emitter follower amplifier; then passing such amplified and refined electrical data through a filter to limit low frequency response; then passing the electrical data through a first operational, isolating amplifier to protect against feedback; then amplifying the electrical data in the second operation, variable gain control amplifier with saturation cut-off; and then passing the electrical data output from said last mentioned amplifier to a suitable display means.

8. A non-invasive method of obtaining greatly amplified P-waves, P-waves inscribed in the range of 10 to 40 mm. on conventional electrocardiogram chart paper, which method includes the steps of initially picking up electrical data from the human heart in the usual manner; amplifying the electrical data in a workable range with a minimum of noise; refining the amplified electrical data; limiting low frequency response; preventing feedback to the said electrical data; effecting final variable gain control amplification of the said electrical data with saturation cut-off; and feeding the data to suitable display means.

9. A non-invasive method of obtaining greatly amplified P-waves which incorporates a high gain, low noise, high common mode rejection amplifier with a variable gain control and a preset sharp cut-off saturation level; utilizing electrodes on the exterior body surface to lead electrical signals from the heart into said amplifier; and, by external control, gradually increasing the low level signals ($p$, $q$, $s$) in gain and then prominently displaying them at the same level as typical electrocardiogram high level signals (Q, R, S), which have now been driven into saturation, would have been displayed; and then obtaining a P-wave amplified to a height of 10 to 40 mm. on a standard electrocardiograph paper so that the relationship of the P-wave to the QRS may be readily determined and diagnosis abnormal heart rhythms greatly facilitated.

10. The method of claim 9 wherein said gain increasing step includes the step of progressively amplifying the low level electrical signals through external control without loss of reference to other signals; and retaining strict linearity of the P-wave and other low level signals without damage to recording equipment.

11. A method of ascertaining information from certain electrical body data which comprises the steps of:

a. utilizing electrodes on the exterior body surface to lead electrical signals from the body into an amplifying system, and b. continuously adjusting the amplification of said amplifying system, by driving the higher level signals into saturation without distortion of the lower level signals, until the desired level, between the orders of 1 to 1,000 times, is reached, and then displaying said amplified electrical signals.

12. The method of claim 11 including the additional step of setting upper and lower levels to which said amplifying system can amplify said electrical signals.

13. The method of claim 11 in which such data and signals are produced by the human heart and in which the amplifying step is applied to the P-wave of the P-Q-R-S-T complex.

14. The method of claim 13 including the steps of modulating, transmitting, and demodulating said amplified P-wave data immediately prior to displaying said amplified P-wave data.

15. The method of claim 14 in which such data is transmitted by telephone.

16. The method of claim 14 in which such data is transmitted by radio transmitter and receiver.

17. The method of claim 14 in which such data is transmitted by tape recorder.

18. The method of claim 13 in which the amplifying step and system includes the use, seriatim, of a differential low noise amplifier, an emitter follower amplifier, a filter for limiting low frequency response, and a pair of operational amplifiers including an isolating amplifier and a variable gain control amplifier with a saturation cut-off.

* * * * *